July 30, 1935.  L. V. BLACK  2,009,431
APPARATUS FOR CASE HARDENING GLASS
Filed Jan. 27, 1933  2 Sheets-Sheet 1
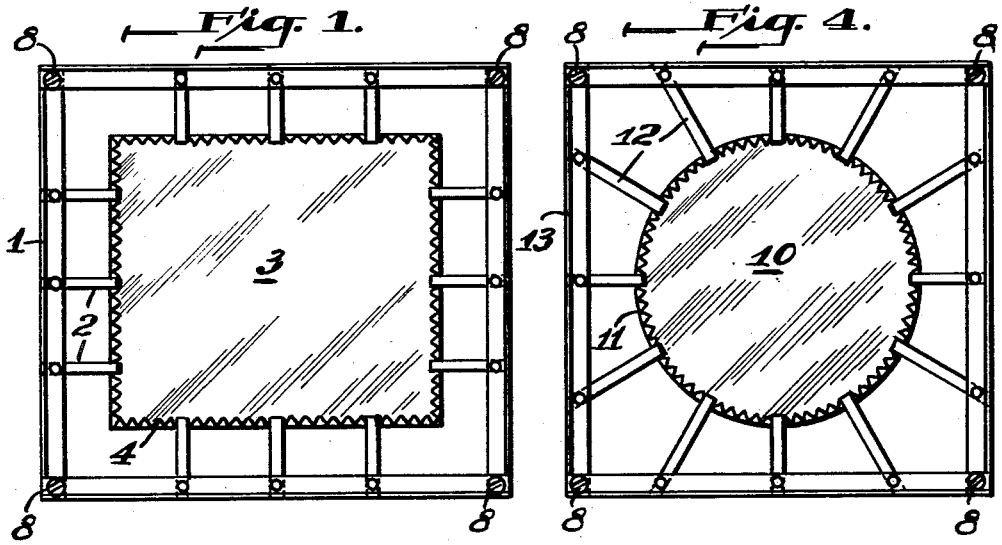
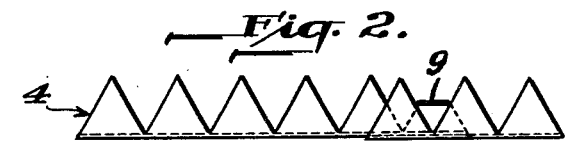
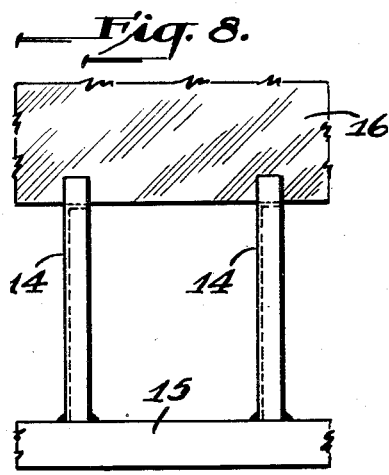
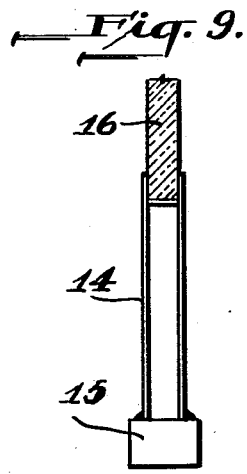
INVENTOR July 30, 1935.  L. V. BLACK  2,009,431
APPARATUS FOR CASE HARDENING GLASS
Filed Jan. 27, 1933  2 Sheets-Sheet 2
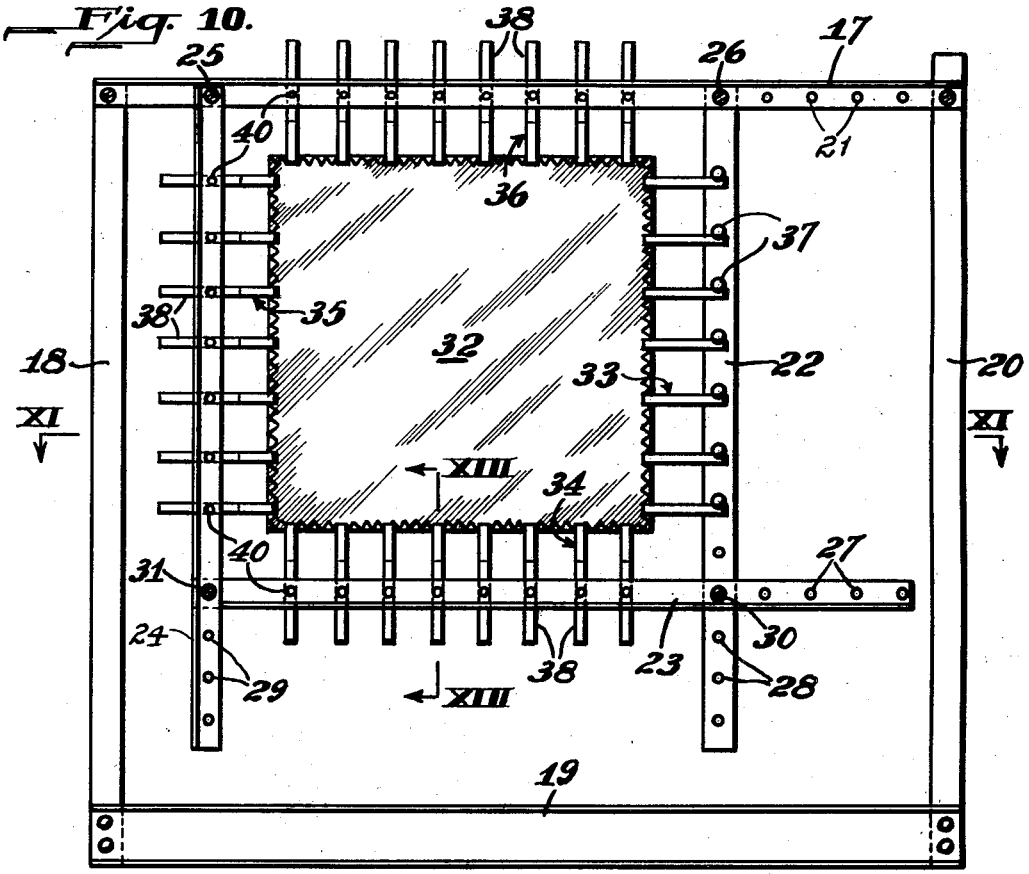
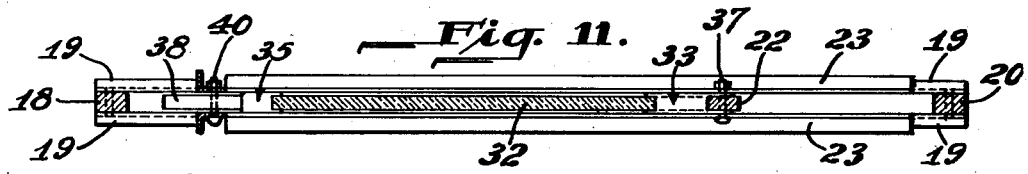
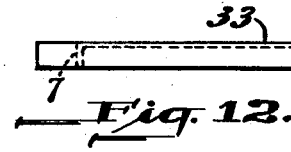
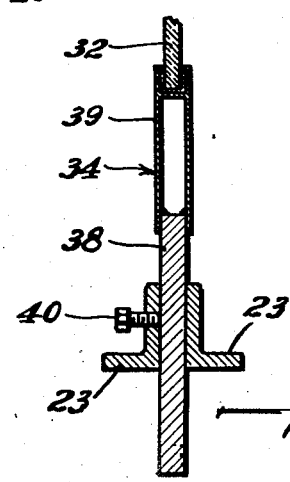
INVENTOR
Lloyd V. Black
by
Bradley & Bee Patented July 30, 1935.

2,009,431

UNITED STATES PATENT OFFICE 2,009,431

APPARATUS FOR CASE HARDENING GLASS

Lloyd V. Black, Tarentum, Pa., assignor to Pittsburgh Plate Glass Company, a corporation of Pennsylvania Application January 27, 1933, Serial No. 653,857

5 Claims. (Cl. 49—45)

This invention relates to an apparatus for case hardening glass, so that its strength and thermal resistance are increased, and more particularly to the means for supporting the glass sheets in carrying out the operation as more fully set forth in my copending application, Serial No. 589,354, filed January 28, 1932. The invention has for its primary object the provision of improved means and procedure for supporting the glass, so that its surface need not be marred by the provision of supporting notches or holes, and whereby the sheet is held against warping during the chilling step of the process. A further object is the provision of supporting means for the edges of the glass which will not appreciably increase the rapidity of chilling the glass at its points of support and thus tend to cause breakage. Certain embodiments of the invention are illustrated in the accompanying drawings, wherein:

Figure 1 is a front elevation showing one means of supporting a glass sheet. Figs. 2 and 3 are detail views of the frame employed. Fig. 4 is a front elevation showing the supporting means applied to a circular sheet of glass. Figs. 5, 6 and 7 are detail views of one of the arms employed in the construction of Figs. 1 and 4. Figs. 8 and 9 are front and end elevational views illustrating a modification. And Figs. 10 to 13 illustrate a further modification, Fig. 10 being a front elevation, Figs. 11 and 13 being sections on the lines XI—XI and XIII—XIII respectively of Fig. 10, and Fig. 12 being an enlarged detail view.

The present commercial practice in case hardening a glass sheet is to support it in a vertical plane, heat it to the softening point, and then cool it quickly by air blasts applied to the opposite sides of the sheet, as set forth in my application heretofore referred to. The sheet must be supported so that it is free to expand and contract in its own plane, and this has been accomplished either by the provision of notches or holes at the upper edges of the sheet which are engaged by supporting hooks, or by a supporting frame provided with arms or blocks having notched ends which engage the edges of the glass on all sides, such blocks or arms being of refractory material, such as asbestos composition. Both methods of support have objectionable characteristics. The support by hooks involves marring of the sheet, while the block or arm support, as provided by the insulating material, retards the heating of the glass edges at the points of contact. Further the blocks or arms are relatively fragile and short lived when exposed to the rapid heating and cooling incident to the tempering operation. Briefly stated, the present improvement overcomes these difficulties by the use of supports formed from thin, poor-conducting, metallic supports for the glass, preferably of nickel chromium composition. These supports are sufficiently strong, are inexpensive, and at the same time offer a supporting surface of large area, do not warp, have indefinite life, and being of small mass with poor heat conduction, do not cause breakage by conducting heat away rapidly from the glass at the points of support during the chilling of the glass. Furthermore in the case of large sheets, frames of the material may be used which offer a rigid support, thus preventing warpage and distortion of the sheets.

Referring to Figs. 1 to 4 of the drawings, 1 is a rectangular frame of angle irons, 2 are supporting arms; 3 is a glass sheet which is to be case hardened; and 4 is a frame applied removably about the edge of the glass sheet. The arms 2 are formed from thin nickle chromium bent into U shape and having poor heat conductivity and high resistance to the action of heat. They are secured at their outer ends to the frame 1 and formed at their inner ends so as to embrace the frame 4 which carries the glass sheet. The inner ends of the arms are shaped to embrace the frame 4 by slotting the webs 5 of the arms along the flanges 6, and then bending down the flap 7, as indicated in Figs. 5 and 6. In order to insert and remove the glass sheet and its frame 4, the members making up the rectangular frame 1 are secured detachably together by the bolts 8.

The frame 4 is also formed of thin nickel chromium bent into U section and serrated, as indicated in Figs. 2 and 3, to reduce the mass of metal in contact with the glass and permit such edge to heat and cool more rapidly during the heating and cooling steps incident to the case hardening of the glass. The serrations also render the frame easy to bend to fit the glass. The frame while sufficiently flexible, due to the serrations, to permit it to be bent without difficulty to conform to the sheet 3, has considerable lateral stiffness, and assists materially in preventing warping and distortion of the glass when it is heated to the softening point and then cooled rapidly in case hadening it, the use of this frame being particularly advantageous in the treatment of the larger sheets of glass. The ends of the frame 4 are secured together to hold the frame in place by overlapping such ends, as indicated in Fig. 2, and bending two of the teeth 9 on one end of the frame laterally so that such teeth lie in the spaces between two teeth on the other end of the frame. After the case hardening operation is completed, the frame is easily removed by straightening the teeth 9, so as to release the interlock. The frame 4 and arms 2 being of poor heat conducting material and small mass, do not conduct heat away from the edges of the glass rapidly during the chilling step of the operation, so that no breakage results from this cause, and the apparatus may be used indefinitely without deterioration or warping due to the heat resisting property of the nickel chromium. It will be understood in this construction, that the use of other compositions having properties similar to those of nickel chromium is contemplated, and that the invention is not limited in this particular.

Fig. 4 shows a modification in which the sheet 10 is circular in shape, instead of rectangular, the sheet being provided with a frame 11 similar to the frame 4 of Figs. 1 to 3 and similarly supported by arms 12 in the frame 13.

Figs. 8 and 9 illustrate a modification of the supporting arms 14, in which the lower ends of such arms are secured to a frame member 15 by brazing them thereto. In other respects these arms are similar to those of Figs. 5, 6 and 7, being provided at their upper ends with recesses to receive the edge of the glass sheet 16. In this construction, the frame 4 of the Fig. 1 construction is omitted and the ends of the arms 14 contact directly with the glass.

Figs. 10 to 13 show a further modification, in which provision is made for adjusting the outer frame carrying the arms, in order to permit the support of sheets 32 of widely varying size. The outer frame in this case comprises the members 17, 18, 19, and 20, the top member 17 being provided with a plurality of holes 21 for adjustment purposes. An inner frame member consists of the side members 22, 23 and 24, the side members being hung from the member 17 by the bolts 25 and 26. The members 22, 23 and 24 are provided with the sets of holes 27, 28 and 29, and the member 23 is secured to the members 22 and 24 by the bolts 30 and 31. The use of the bolts 26, 30 and 31 in conjunction with the sets of holes 21, 27 and 29, permits the inner frame to be increased in size depending on the size of the sheet 32 which is to be carried thereby.

The glass sheet is carried in the inner frame by means of the three sets of arms 33, 34, 35 and 36. The sets of arms 34, 35 and 36 are all the same in construction, and are mounted for endwise adjustment to take care of different sizes of glass sheets, while the arms 33 have only one position of adjustment but are removable to permit of the ready insertion and removal of the glass sheets.

The arms 33 are of angular cross section and are of light nickel chromium, for the reason heretofore explained. The member 22 is slotted (Fig. 13) and each slot receives one of the flanges of an arm 33, the arms being clamped in position by the screws 37. The arms 34, 35 and 36 each comprise a square rod 38 (Fig. 12) to which is brazed a nickel chromium end member 39 similar to that shown in Figs. 5 to 7, such end member engaging the edge of the glass sheet. The square rod is mounted for endwise adjustment between the angles, which make up the members 23, 24 and 17, and is clamped in position by a set screw 40. The sheet 32 is thus supported throughout by light nickel chromium contact members of relatively small mass, so that the advantages incident to the other supporting means of a similar character, as heretofore pointed out, are secured. The arms conduct a minimum amount of heat from the edges of the glass during the chilling step of the process, and at the same time are of sufficient rigidity to prevent deformation or warping of the sheet throughout the case hardening operation. The nickel chromium supports and frames are used throughout and preferably formed from sheets about ten one-thousandths of an inch thick.

What I claim is:

1. In combination, a device for supporting a glass sheet during case hardening, comprising an open outer framework, an inner frame of U-cross section adapted to surround and engage the periphery of the glass sheet, and spaced arms projecting inwardly from the framework and releasably engaging said frame, said frame consisting of heat resisting metal of low conductivity and small mass.

2. In combination, a device for supporting a glass sheet during case hardening, comprising an open outer framework, an inner frame of U-cross section adapted to surround and engage the periphery of the glass sheet, and spaced arms projecting inwardly from the framework and releasably engaging said frame, said frame and arms consisting of heat resisting metal of low conductivity and small mass.

3. In combination, a device for supporting a glass sheet during case hardening, comprising an open outer framework, an inner frame of U-cross section having its flanges serrated, adapted to surround and engage the periphery of the glass sheet, and spaced arms projecting inwardly from the framework and releasably engaging said frame, said frame consisting of heat resisting metal of low conductivity and small mass.

4. In combination, a device for supporting a glass sheet during case hardening, comprising an open outer framework, an inner frame of nickel chromium U-shape in cross section and of small mass adapted to surround and engage the periphery of the glass sheet, and rigid spaced arms of heat resisting metal projecting inwardly from the framework and having their inner ends recessed so as to releasably engage said frame.

5. In combination, a device for supporting a glass sheet during case hardening, comprising an open outer framework, an inner frame of nickel chromium of U-shape in cross section and of small mass adapted to surround and engage the periphery of the glass sheet, and rigid spaced arms of heat resisting metal and small mass projecting inwardly from the framework and having their inner ends recessed so as to releasably engage said frame.

LLOYD V. BLACK.